US012482849B2

(12) United States Patent
Jeung et al.

(10) Patent No.: US 12,482,849 B2
(45) Date of Patent: Nov. 25, 2025

(54) ASSEMBLY LINE SYSTEM OF STACKED BATTERY MODULE

(71) Applicant: LG ENERGY SOLUTION, LTD., Seoul (KR)

(72) Inventors: Seok-Won Jeung, Daejeon (KR); Choon-Kwon Kang, Daejeon (KR); Geon-Tae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 17/911,091

(22) PCT Filed: Dec. 16, 2021

(86) PCT No.: PCT/KR2021/019236
§ 371 (c)(1),
(2) Date: Sep. 12, 2022

(87) PCT Pub. No.: WO2022/158725
PCT Pub. Date: Jul. 28, 2022

(65) Prior Publication Data
US 2023/0307686 A1 Sep. 28, 2023

(30) Foreign Application Priority Data
Jan. 19, 2021 (KR) .......................... 10-2021-0007561

(51) Int. Cl.
*H01M 10/04* (2006.01)
*G01R 31/3835* (2019.01)
*H01M 10/42* (2006.01)

(52) U.S. Cl.
CPC .... *H01M 10/0404* (2013.01); *G01R 31/3835* (2019.01); *H01M 10/4285* (2013.01)

(58) Field of Classification Search
CPC ......... H01M 10/0404; H01M 2220/20; H01M 10/4285; G01R 31/3835
See application file for complete search history.

(56) References Cited

U.S. PATENT DOCUMENTS

| 4,074,423 | A | * | 2/1978 | DiGiacomo | ........ H01M 50/541 |
| | | | | | 29/730 |
| 4,164,310 | A | * | 8/1979 | Di Giacomo | ....... H01M 50/541 |
| | | | | | 228/58 |

(Continued)

FOREIGN PATENT DOCUMENTS

| CN | 106697880 A | 5/2017 |
| CN | 207504114 U | 6/2018 |

(Continued)

OTHER PUBLICATIONS

The extended European search report issued in corresponding EP Patent Application No. 21921482.2, dated Oct. 25, 2024.

(Continued)

*Primary Examiner* — Minh N Trinh
(74) *Attorney, Agent, or Firm* — Morgan, Lewis & Bockius LLP (57) ABSTRACT

Disclosed is an assembly line system of a stacked battery module, which includes a first facility line configured to assemble a cell housing and accommodate battery cells in the cell housing; a second facility line configured to assemble an electric connection component and a voltage sensing component; and a third facility line configured to connect the battery cells to each other in series and in parallel and to inspect functional abnormality thereof, wherein the first facility line, the second facility line and the third facility line are arranged to circulate in order based on a predetermined origin, and a first-layer cell module assembly assembled at a first circulation is reversed to change the (Continued)

top and bottom thereof so that a second-layer cell module assembly is assembled on the first-layer cell module assembly at a second circulation.

14 Claims, 11 Drawing Sheets

(56) References Cited

U.S. PATENT DOCUMENTS

| | | | |
|---|---|---|---|
| 6,279,224 B1* | 8/2001 | Wirtz | B23Q 41/02 29/730 |
| 2018/0074130 A1 | 3/2018 | Jeung et al. | |
| 2018/0131028 A1 | 5/2018 | Offutt et al. | |
| 2023/0307686 A1* | 9/2023 | Jeung | H01M 10/4285 |

FOREIGN PATENT DOCUMENTS

| | | |
|---|---|---|
| CN | 108365252 A | 8/2018 |
| JP | 2018-190528 A | 11/2018 |
| JP | 2019-021533 A | 2/2019 |
| KR | 10-2013-0025246 A | 3/2013 |
| KR | 10-2015-0037315 A | 4/2015 |
| KR | 10-2016-0143068 A | 12/2016 |
| KR | 10-2017-0036398 A | 4/2017 |
| KR | 10-2017-0071077 A | 6/2017 |

OTHER PUBLICATIONS

International Search Report (with partial translation) and Written Opinion dated Mar. 28, 2022, for corresponding International Patent Application No. PCT/KR2021/019236.
Office Action dated Oct. 3, 2025, issued in corresponding Taiwanese Patent Application No. 111101670.

* cited by examiner

ASSEMBLY LINE SYSTEM OF STACKED BATTERY MODULE

TECHNICAL FIELD

The present application claims priority to Korean Patent Application No. 10-2021-0007561 filed on Jan. 19, 2021 in the Republic of Korea, the disclosures of which are incorporated herein by reference.

The present disclosure relates to an assembly line system of a battery module, and more particularly, to an assembly line system of a stacked battery module in which a plurality of cell module assemblies are stacked.

BACKGROUND ART

A secondary battery refers to a battery that can be charged and discharged, unlike a primary battery that cannot be recharged, and the secondary battery is being used as a power source for an energy storage system (ESS), an electric vehicle (EVs) or a hybrid electric vehicle (HEV) as well as a small high-tech electronic device such as a mobile phone, a PDA, and a notebook computer.

Currently, one secondary battery (cell) is not able to give sufficient output to drive an electric vehicle. In order to apply a secondary battery as an energy source for an electric vehicle, for example, a battery module in which a plurality of lithium-ion battery cells are connected in series and/or in parallel should be configured, and generally, a battery pack is configured to include a BMS (Battery Management System), a cooling system, a BDU (Battery Disconnection Unit), an electric wiring cable, and the like for connecting the battery modules in series and maintaining them functionally.

Meanwhile, in the case of a conventional layout of a facility for mass production of battery modules, it is designed in a logistics structure in which logistics flows in one direction from the input of basic components to the discharge of a final battery module.

Figure 1:
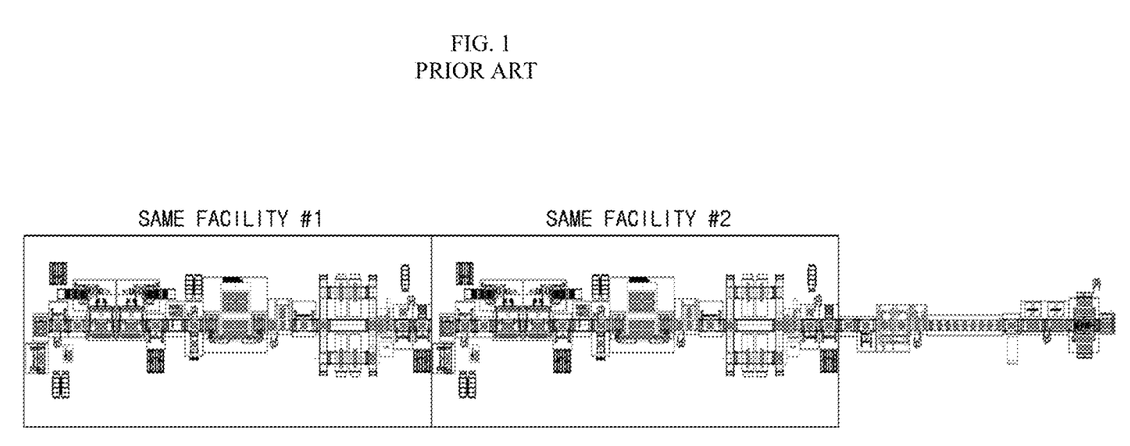
FIG. 1 is a diagram schematically showing a conventional assembly line system of a stacked battery module.

Recently, as a new battery module, the applicant has developed a stacked battery module in which a first cell module assembly is manufactured and reversed to change the top and bottom thereof and a second cell module assembly of the same structure is stacked thereon. However, since the conventional assembly line facility of the battery module has a structure in which logistics flows in one direction, in order to apply the conventional assembly line facility for manufacturing the new stacked battery module, as shown in FIG. 1, two facilities with the same concept are required, compared to the existing one. Accordingly, the development of a new battery module assembly line system more suitable for manufacturing the new stacked battery module is required.

DISCLOSURE

Technical Problem

The present disclosure is designed to solve the problems of the related art, and therefore the present disclosure is directed to providing an assembly line system for a stacked battery module, which may efficiently operate the space by reducing redundant facility investment and reducing the length and area of an equipment layout in building the assembly line of a stacked battery module.

The technical object to be solved by the present disclosure is not limited to the above, and other objects not mentioned herein will be clearly understood by those skilled in the art from the following disclosure.

Technical Solution

In one aspect of the present disclosure, there is provided an assembly line system of a stacked battery module, comprising: a first facility line configured to assemble a cell housing and accommodate battery cells in the cell housing; a second facility line configured to assemble an electric connection component and a voltage sensing component; and a third facility line configured to connect the battery cells to each other in series and in parallel and to inspect functional abnormality thereof, wherein the first facility line, the second facility line and the third facility line are arranged to circulate in order based on a predetermined origin, and a first-layer cell module assembly assembled at a first circulation is reversed to change the top and bottom thereof so that a second-layer cell module assembly is assembled on the first-layer cell module assembly at a second circulation.

The first facility line, the second facility line and the third facility line may be arranged in a circulation structure of a 'E' shape.

The first facility line may be arranged along a first direction, and the first facility line may include: a heatsink preprocessing unit located at the predetermined origin and configured to receive a heatsink to perform plasma treatment on a surface of the heatsink; a bottom frame assembling unit configured to attach a bottom frame to one surface of the heatsink; a cell inserting unit configured to insert battery cells into cell insert holes provided in the bottom frame; and a top frame assembling unit configured to cover the battery cells and assemble a top frame to be coupled with the bottom frame.

The bottom frame assembling unit may include a bar code laser marking machine for marking a bar code on the bottom frame.

The first facility line may include a plasma surface treatment machine for preprocessing surfaces of the heatsink, the bottom frame, the battery cell and the top frame with plasma.

The second facility line may be connected to the first facility line, and the second facility line may include: a component assembling unit arranged along the first direction and configured to attach a plurality of bus bars and a sensing cable to the top frame; a jig fastening unit arranged along the first direction in succession to the component assembling unit and configured to mount a press jig to a temporary-assembled cell module assembly immediately after passing through the component assembling unit; a carrying unit configured to carry the temporary-assembled cell module assembly to which the press jig is mounted in a second direction intersecting the first direction; a curing chamber unit arranged along a third direction opposite to the first direction at a location spaced apart from the jig fastening unit in the second direction by a predetermined interval and configured to cure an adhesive applied to the temporary-assembled cell module assembly; a jig dismantling unit configured to dismantle the press jig from the temporary-assembled cell module assembly that has passed through the curing chamber unit; and a vision inspection unit configured to inspect an appearance of the temporary-assembled cell module assembly from which the press jig is dismantled.

The curing chamber unit may be provided in plural, and the plurality of curing chamber units may be arranged side by side along the third direction.

An infrared ray may be irradiated into the curing chamber unit so that the curing chamber unit maintains an internal temperature of 45° C. to 65° C.

The second facility line may further include a jig retrieving line arranged in a direction different from the vision inspection unit with respect to the jig dismantling unit and configured to carry out the press jig separated from the jig dismantling unit.

The third facility line may be connected to the second facility line, and the third facility line may include: a wire bonding unit arranged along the third direction and configured to bond the battery cells and the plurality of bus bars in a predetermined pattern onto the top frame using a wire; an OCV (Open Circuit Voltage) test unit configured to inspect an abnormality by inspecting an appearance of the wire bonding and measuring an OCV; a top cover assembling unit configured to attach a top cover onto the wire-bonded top frame; and an interchanging unit configured to selectively carry the cell module assembly to which the top cover is attached from the top cover assembling unit to the heatsink preprocessing unit of the first facility line.

The wire bonding unit may be provided in plural, and the plurality of wire bonding units may be arranged side by side along the third direction.

The interchanging unit may include a rollover machine for reversing the first-layer cell module assembly to change the top and bottom thereof, and a transfer machine for transferring the first-layer cell module assembly to the heatsink preprocessing unit.

The interchanging unit may include a bar code reader for reading a bar code marked in advance on the bottom frame.

The assembly line system of a battery module may further comprise a fourth facility line disposed to be connected to the third facility line and not to be connected to the first facility line and configured to inspect performance of the stacked battery module and package the stacked battery module.

In the first facility line, a unique bar code that stores layer number information may be marked in advance on the cell housing, and the first facility line, the second facility line and the third facility line may be provided to identify the first-layer cell module assembly and the second-layer cell module assembly by reading the bar code.

Advantageous Effects

According to an embodiment of the present disclosure, it is possible to provide an assembly line system for a stacked battery module, which may efficiently operate the space by reducing redundant facility investment and reducing the length and area of an equipment layout in building the assembly line of a stacked battery module.

In particular, since the assembly line system according to the present disclosure includes facility lines arranged in a circulation structure of a 'E' shape, the assembly process efficiency is excellent when cell module assemblies of the same structure are implemented in multiple layers.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure. In addition, since the embodiment of the present disclosure is provided to more fully explain the present disclosure to those skilled in the art, the shape and size of components in the drawings may be exaggerated, omitted or schematically illustrated for a clearer description. Therefore, the size or proportion of each component does not fully reflect the actual size or proportion.

Figure 2:
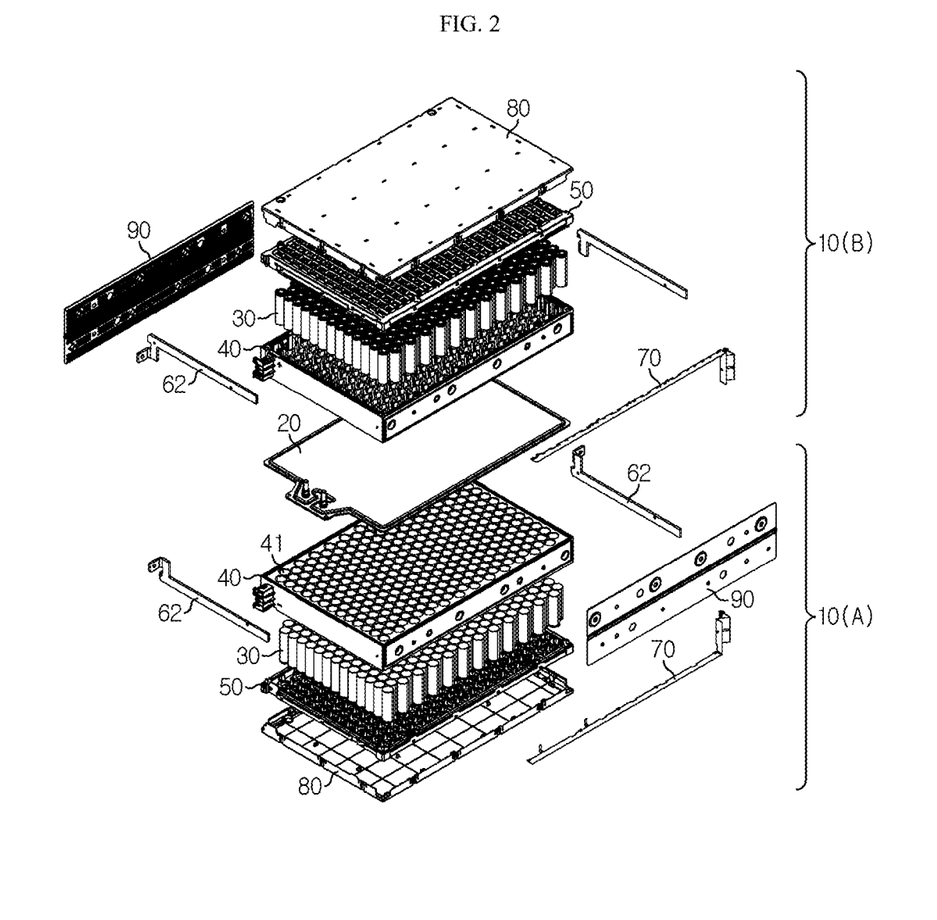
FIG. 2 is an exploded perspective view schematically showing a stacked battery module that may be manufactured using an assembly line system according to an embodiment of the present disclosure.
Figure 3:
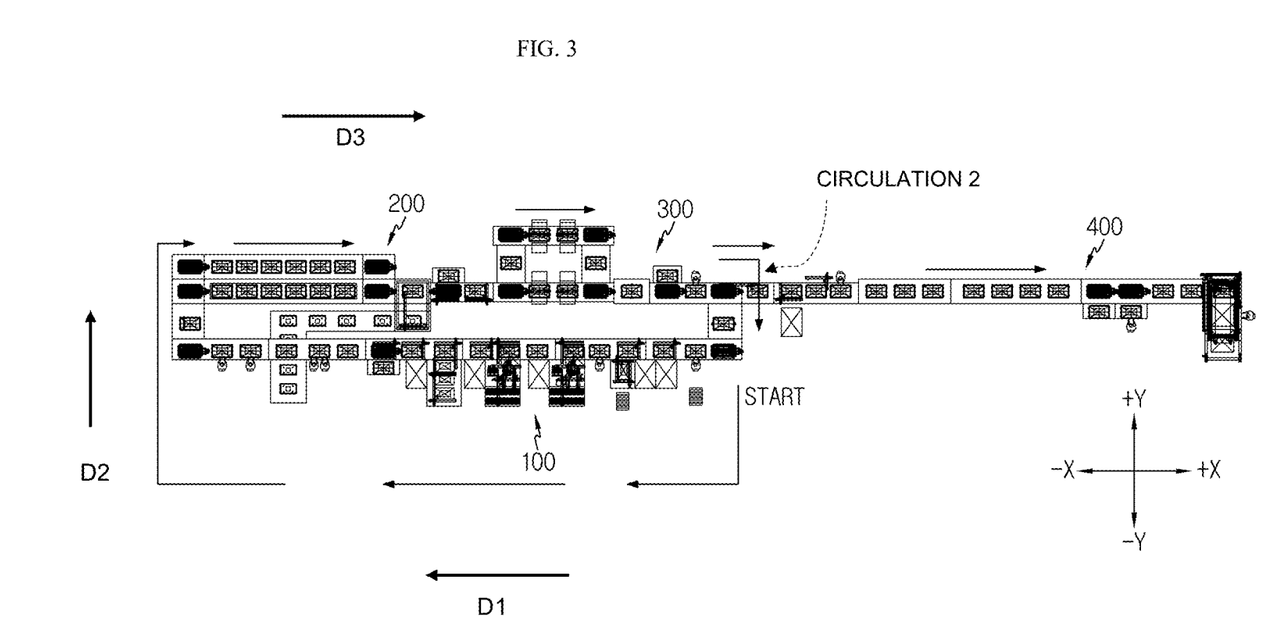
FIG. 3 is a diagram schematically showing the assembly line system according to an embodiment of the present disclosure.

FIG. 2 is an exploded perspective view schematically showing a stacked battery module that may be manufactured using an assembly line system according to an embodiment of the present disclosure, and FIG. 3 is a diagram schematically showing the assembly line system according to an embodiment of the present disclosure.

The assembly line system according to an embodiment of the present disclosure may be applied to manufacture a stacked battery module, namely a stacked battery module including two cell module assemblies vertically symmetrical to each other based on a heatsink 20, as shown in FIG. 2.

Before explaining the assembly line system according to the present disclosure, the configuration of the stacked battery module will be briefly explained. Each cell module assembly 10A, 10B of the stacked battery module includes a plate-shaped heatsink 20 having a flow path formed therein so that a coolant flows therethrough, a bottom frame 40 bonded to one surface of the heatsink 20, battery cells 30 interposed in cell insert holes 41 of the bottom frame 40, a top frame 50 for covering the battery cells 30 and coupled with the bottom frame 40, bus bars 61, 62 for electrically connecting the battery cells 30, a sensing cable 70 for voltage or temperature sensing, and a top cover 80 for covering the top frame 50.

In the stacked battery module, the first-layer cell module assembly 10A and the second-layer cell module assembly 10B share one heatsink 20 and include other components individually. In addition, a bracket 90 is a component attached to both side surfaces of the stacked battery module, and may be used to fix the stacked battery module to a structure inside a battery pack.

The assembly line system according to an embodiment of the present disclosure includes a first facility line 100, a second facility line 200, and a third facility line 300.

As shown in FIG. 3, the first facility line 100, the second facility line 200, and the third facility line 300 are arranged to circulate in order based on a predetermined origin.

The first facility line 100, the second facility line 200, and the third facility line 300 are preferably arranged in a circulation structure of approximately a '□' shape, when viewed from above. The circulation structure of a '□' shape minimizes the waste of space for facility construction and makes it easy to secure the movement of workers. However, depending on the circumstances of the environment where the assembly line system is to be built, the 'circulation structure of a '□' shape may be changed into a circulation structure of, for example, a 'Δ', '○' or '◇' shape.

As will be described later in detail, if the first facility line 100, the second facility line 200, and the third facility line 300 are operated one time in order, the first-layer cell module assembly 10A may be completed, and if they are operated twice, the second-layer cell module assembly 10B may be completed on the first-layer cell module assembly 10A. In other words, the first-layer cell module assembly 10A is assembled by one circulation (e.g., a first circulation beginning at START in FIG. 3) along the first facility line 100, the second facility line 200 and the third facility line 300, and then, if another circulation (e.g., a second circulation beginning at CIRCULATION 2 in FIG. 3) is performed in a state where the first-layer cell module assembly 10A is reversed such that the heatsink 20 is located at the top, the second-layer cell module assembly 10B having the same structure may be assembled and stacked on the first-layer cell module assembly 10A.

Hereinafter, the first facility line 100 to the third facility line 300 will be described in detail with reference to FIGS. 4 to 9 along with FIG. 3.

First, the first facility line 100 is configured to perform the process of assembling a cell housing and accommodating the battery cells 30 in the cell housing. Here, the battery cell 30 refers to a cylindrical battery cell 30. The cylindrical battery cell 30 refers to a secondary battery in which an electrolyte and an electrode assembly are put in a cylindrical battery can and a top open end of the battery can is sealed with a top cap. The cylindrical battery cell 30 may be replaced with a rectangular battery cell 30 having a rectangular parallelepiped shape.

Figure 4:
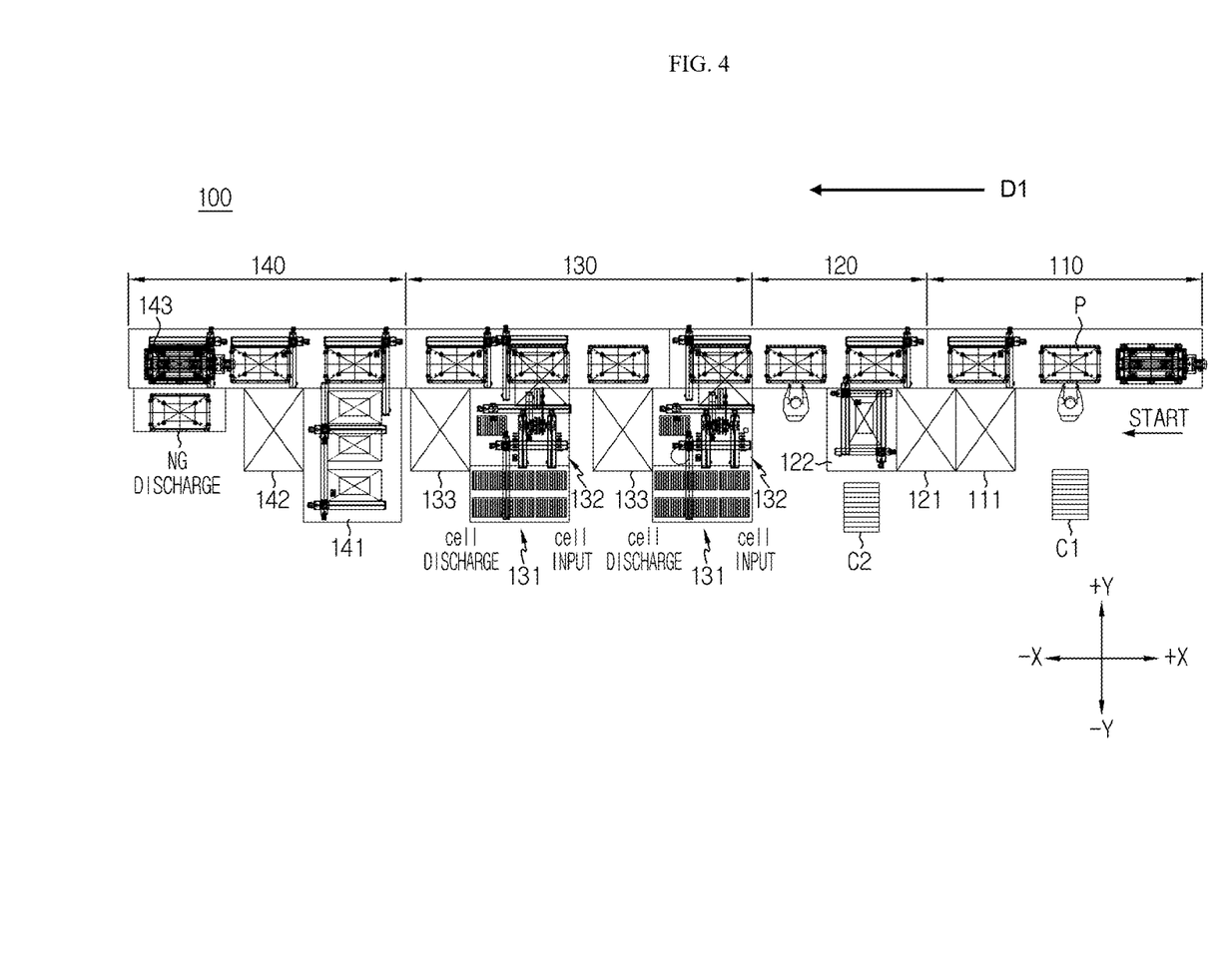
FIG. 4 is an enlarged view showing a first facility line of FIG. 3.

As shown in FIG. 4, the first facility line 100 may be arranged along a first direction (D1 in the −X-axis direction of FIGS. 3 and 4) and include a heatsink preprocessing unit 110, a bottom frame assembling unit 120, a cell inserting unit 130, and a top frame assembling unit 140.

Logistics of the first facility line 100 may be moved by a conveyor. Each process may be performed while each cell module assembly mounted on a pallet P moves along the conveyor.

The heatsink preprocessing unit 110 corresponds to the origin for product assembly, and includes a plasma surface treatment machine.

Heatsinks 20 may be loaded on a deck truck C1 and fed to the heatsink preprocessing unit 110. A worker takes out the heatsinks 20 one by one from the deck truck C1, performs a leak test using an air-gun, and places the heatsink 20 with no abnormalities on the pallet P.

Then, the heatsink 20 moves in the first direction so that a surface thereof may be preprocessed with plasma at a place where the plasma surface treatment machine is located. If the surface of the heatsink 20 is reformed with plasma, the bonding force may be improved.

Since the heatsink 20 is made of metal with high thermal conductivity and the bottom frame 40 is made of plastic resin, long-term bonding stability may be deteriorated when they are bonded using an adhesive. To compensate for this, after performing the surface preprocessing process with plasma, the heatsink 20 and the bottom frame 40 are bonded to reinforce the bonding force. For example, various materials such as polypropylene (PP), polyether ether ketone (PEEK) or polyoxymethylene (POM) cannot be bonded or is poorly bonded without plasma surface treatment. Therefore, when bonding the heatsink 20, the bottom frame 40, the top frame 50, or the like to each other, it is recommended to preprocess the bonding surface with plasma.

The bottom frame assembling unit 120 may include a plasma surface treatment machine, a bar code laser marking machine, a glue applicator, and a workbench.

Figure 5:
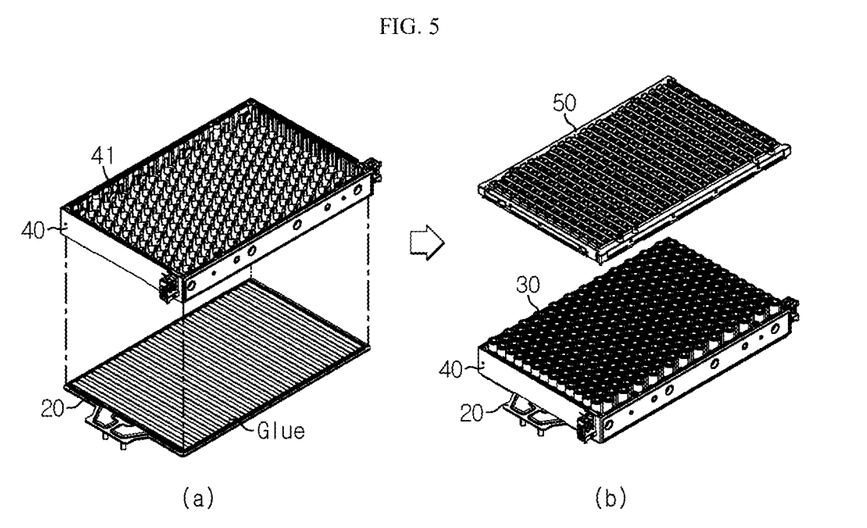
FIG. 5 is a process diagram of the cell module assembly performed in the first facility line of FIG. 4.

If the heatsink 20 is moved to the bottom frame assembling unit 120, an adhesive is applied to the surface thereof, and the bottom frame 40 is placed on the heatsink 20 as shown in FIG. 5(a). The adhesive may be applied to the heatsink 20 automatically using a glue applicator (not shown).

The bottom frame 40 may be loaded on a deck truck C2 in a pre-fabricated state like the above-mentioned heatsink 20 and put into the bottom frame assembling unit 120. Each bottom frame 40 may be surface-treated with plasma, and a bar code may be marked on a side surface thereof. In the bar code, information about the production history including layer number information of the cell module assembly including the corresponding bottom frame 40 may be stored. Thereafter, in each process, it is possible to identify the first-layer cell module assembly 10A and the second-layer cell module assembly 10B by reading the bar code so that the height of the process facilities may be adjusted and the operation may be automatically performed.

The worker places the bottom frame 40 surface-treated with plasma and having a marked bar code on the heatsink 20 prepared on the workbench and bonds the bottom frame 40 to the heatsink 20. By bonding the heatsink 20 and the bottom frame 40 in this way, a part of the cell housing is completed. The completed part of the cell housing moves to the cell inserting unit 130. In this embodiment, a worker assembles the heatsink 20 and the bottom frame 40, but an automated robot may replace the worker.

The cell inserting unit 130 may be configured to include a cell supply/discharge machine 131, a cell pickup equipment 132, and a plasma surface treatment machine 133.

The bottom frame 40 has a cell insert hole 41 into which the battery cell 30 may be inserted. In the cell inserting unit 130, as shown in (b) of FIG. 5, the process of inserting the battery cell 30 into the cell insert hole 41 of the bottom frame 40 is performed.

The battery cells 30 are supplied to and discharged from the cell inserting unit 130 through the cell supply/discharge machine 131. Before assembling the battery cells 30 to the bottom frame 40, the grading work of measuring an open circuit voltage of each battery cell 30 and classifying them by grade may be preceded. After the grading work, the defective battery cells 30 may be discharged separately, and good battery cells 30 may be be inserted into the bottom frame 40 by the cell pickup equipment 132.

The bottom surface of the battery cell 30 is bonded to the adhesion surface to the heatsink 20 through the cell insert hole 41 of the bottom frame 40. At this time, in order to strengthen the bonding force between the bottom surface of the battery cell 30 and the heatsink 20, the bottom surface of the battery cell 30 may be treated with plasma before inserting the battery cell 30 into the cell insert hole 41. In addition, a process of applying an adhesive to an upper periphery of the side surface of the battery cell 30 to bond the battery cells 30 to each other may also be added.

In this embodiment, in order to reduce the tact time, the cell supply/discharge machine 131, the cell pickup equipment 132, and the plasma surface treatment machine 133 are provided in two sets. For example, among 100 battery cells 30, the cell insertion operation is performed for 50 battery cells by using the first set of facilities, and the cell insertion operation is performed for the remaining 50 battery cells by using the second set of facilities. If the cell insertion operation is completed, the process proceeds to the next step for attaching the top frame 50.

The top frame assembling unit 140 may be configured to include a frame input machine 141, a plasma surface treatment machine 142, and a transfer machine 143. In the top frame assembling unit 140, a process of separating and discharging defective assembled products through the assembly and vision inspection of the top frame 50 may be performed.

Like the bottom frame 40, the top frame 50 may be pre-fabricated and loaded on a deck truck (not shown) and supplied to the frame input machine 141. The top frame 50 moves in a second direction (+Y-axis direction) in the frame input machine 141, and after the upper and lower surfaces thereof are treated with plasma, an adhesive may be applied thereto, and the top frame 50 may be attached to the upper portion of the bottom frame 40.

In the state of being assembled up to this point, the appearance of the product is inspected, and by using the transfer machine 143, defective products are discharged out of the assembly line, and only good products are moved to the second facility line 200.

Figure 6:
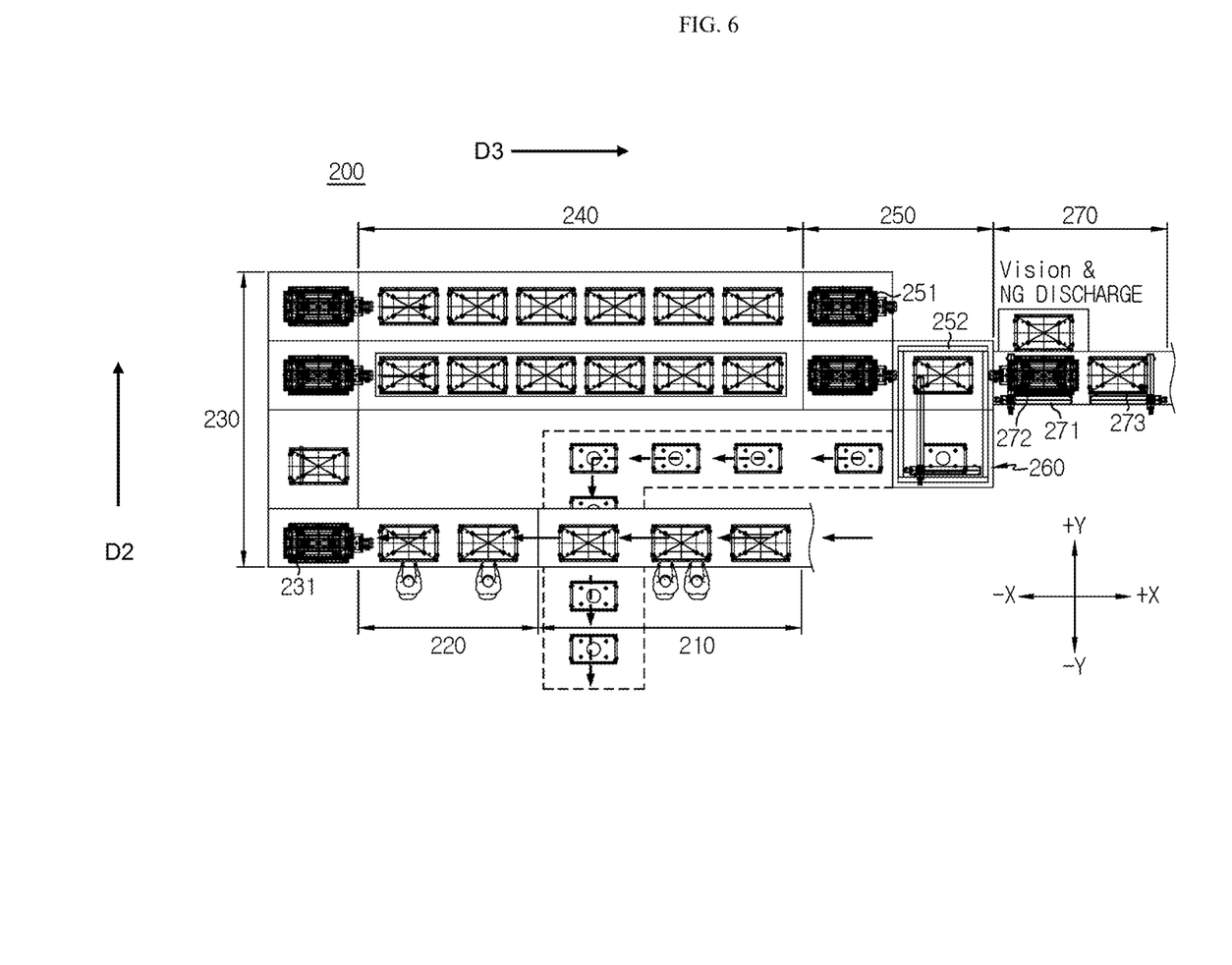
FIG. 6 is an enlarged view showing a second facility line of FIG. 3.
Figure 7:
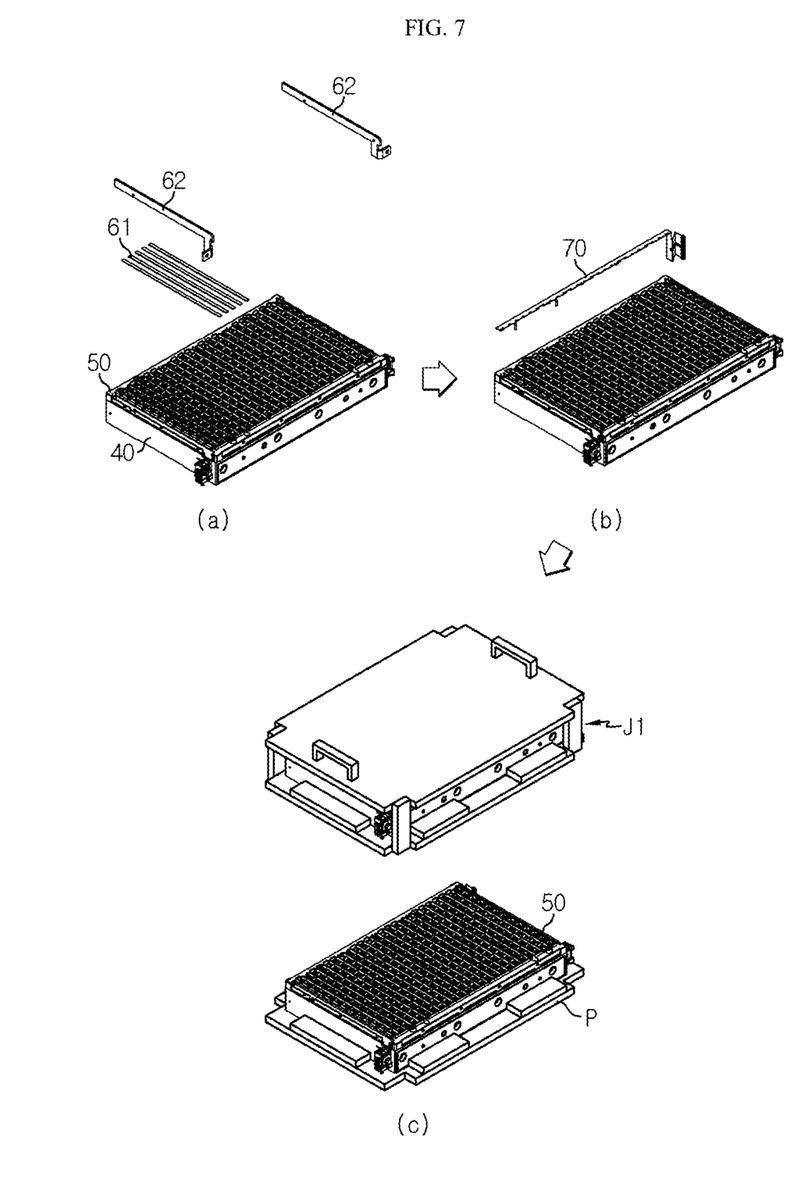
FIG. 7 is a process diagram of the cell module assembly performed in the second facility line of FIG. 6.

Referring to FIG. 6, the second facility line 200 is connected to the first facility line 100, and includes a component assembling unit 210, a jig fastening unit 220, a carrying unit 230, a curing chamber unit 240, a jig dismantling unit 250, a vision inspection unit 270 and a jig retrieving line 260. In the second facility line 200, the logistics are moved by a conveyor and a transfer machine.

The component assembling unit 210 is connected to the top frame assembling unit 140 of the first facility line 100 and is arranged in the first direction (−X-axis direction). In the component assembling unit 210, as shown in (a) and (b) of FIG. 7, the sub bus bar 61, the main bus bar 62 and the sensing cable 70 may be attached to the upper surface of the top frame 50.

In this embodiment, the worker attaches the sub bus bar 61 loaded on the deck truck (not shown) to the top frame 50, but the component assembling work may also be replaced with an automated robot.

For reference, when configuring a battery module using cylindrical battery cells 30, the cylindrical battery cells 30 of one bank (parallel bundle) are arranged side by side in a line, and a straight sub bus bar 61 is disposed between one bank and another adjacent bank. In addition, a top cap (corresponding to a positive electrode) of each cylindrical battery cell 30 belonging to one bank is wire-bonded to the sub bus bar 61, and a top end (corresponding to a negative electrode) of the battery can of each cylindrical battery belonging to another bank is wire-bonded to the sub bus bar 61 to connect two banks in series. There are two main bus bars 62, and two main bus bars 62 are arranged at both outermost sides according to the arrangement direction of the sub bus bars 61 one by one, and function as a positive electrode terminal and a negative electrode terminal of the cell module assembly. The sensing cable 70 is a component for sensing the voltage of each bank and transmitting it to a BMS, and the sensing cable 70 may be implemented as a flexible printed circuit board (FPCB) or a harness cable.

Hereinafter, a product assembled up to components such as the sub bus bar 61 will be referred to as a temporary-assembled cell module assembly for convenience. The temporary-assembled cell module assembly may be regarded as a product immediately after assembling up to the component assembling unit 210.

The jig fastening unit 220 is arranged in the first direction (−X-axis direction) in succession to the component assembling unit 210. In the jig fastening unit 220, as shown in (c) of FIG. 7, a press jig J1 may be mounted to the temporary-assembled cell module assembly. The press jig J1 presses the temporary-assembled cell module assembly mounted on the pallet P to prevent lifting of the bonding area and enable the components to be tightly bonded and fixed to each other.

The press jig J1 is supplied to the jig fastening unit 220 by a deck truck (not shown), and the worker mounts the press jig J1 to the temporary-assembled cell module assembly. Of course, the corresponding work may also be replaced by an automated robot.

The carrying unit 230 is arranged in the second direction (D2 in the +Y-axis direction of FIGS. 3 and 6) and includes at least one transfer machine 231. In the carrying unit 230, the temporary-assembled cell module assembly to which the press jig J1 is mounted may be transferred to the curing chamber unit 240.

Though not shown in detail for the sake of convenience in the drawings, the curing chamber unit 240 may include a chamber installed on the conveyor and a curing machine (not shown) provided inside the chamber. The curing chamber unit 240 may be provided at a location spaced apart from the jig fastening unit 220 by a predetermined distance in the second direction (+Y-axis direction), and may be arranged along a third direction (D3 in the +X-axis direction of FIGS. 3 and 6) opposite to the first direction.

The temporary-assembled cell module assembly may be inserted into the chamber of the curing chamber unit 240 and moved along the third direction. The curing machine provided inside the chamber may be configured to maintain the temperature inside the chamber at 45° C. to 65° C. and irradiate an infrared ray. As the temporary-assembled cell module assembly passes through the curing chamber unit 240, the adhesive component of the adhesive interface may be cured quickly with high quality.

In this embodiment, there are two curing chamber units 240, and the two curing chamber units 240 are arranged side by side along the third direction. However, three or more curing chamber units 240 may also be provided in consideration of working speed, production yield, facility investment cost, or the like.

The jig dismantling unit 250 may be configured to include a transfer machine 251 and a jig dismantling machine 252. The temporary-assembled cell module assembly that has passed through the curing chamber unit 240 may be loaded onto a jig dismantling workbench by the transfer machine 251 and separated from the press jig J1 by the jig dismantling machine 252.

The separated press jig J1 may be moved to the jig retrieving line 260 and discharged to the outside of the assembly line. The jig retrieving line 260 is arranged in a direction different from the vision inspection unit 270 with respect to the jig dismantling unit 250. For example, as shown in FIG. 6, the jig retrieving line 260 may be implemented as a conveyor that extends in the first direction (−X-axis direction) and then extends in a fourth direction (−Y-axis direction). Here, the jig retrieving line 260 may be provided at a level lower than the conveyor of the first facility line 100 so as to pass under the first facility line 100 without interfering with the first facility line 100.

The vision inspection unit 270 may be arranged in the third direction (+X-axis direction) in succession to the jig dismantling unit 250 and may be configured to include a vision inspection machine 271, a transfer machine 272 and a laser cleaning equipment 273.

The vision inspection unit 270 may inspect the appearance of the temporary-assembled cell module assembly to discharge defective products using the transfer machine 272 and to wipe out adhesive and other foreign substances from the surface of a normal product using the laser cleaning equipment 273.

The temporary-assembled cell module assembly cleaned in the vision inspection unit 270 may be moved to the third facility line 300.

Figure 8:
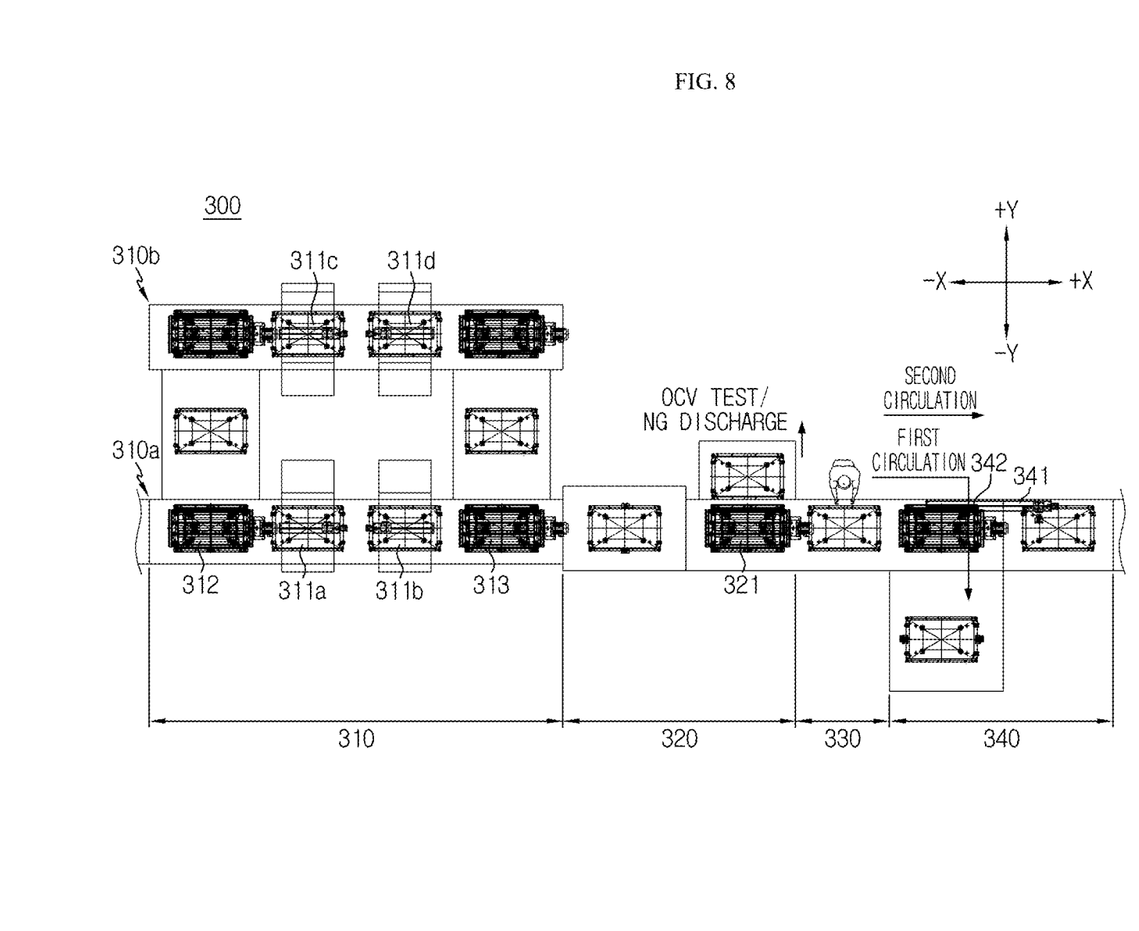
FIG. 8 is an enlarged view showing a third facility line of FIG. 3.

As shown in FIG. 8, the third facility line 300 may include a wire bonding unit 310, an OCV test unit 320, a top cover assembling unit 330, and an interchanging unit 340. The main logistics of the third facility line 300 is moved by the conveyor, and the secondary logistics is moved by the transfer machine.

The wire bonding unit 310 is connected to the vision inspection unit 270 of the second facility line 200 and is arranged along the third direction (+X-axis direction). The wire bonding unit 310 of this embodiment is configured in two lines, and the wire bonding units 310 are side by side along the third direction, and respectively have two wire welding machines 311a to 311d.

That is, as shown in FIG. 8, the wire bonding unit 310 includes a first wire bonding unit 310 and a second wire bonding unit 310 at a location spaced apart by a predetermined distance in the second direction from the first wire bonding unit 310, and the logistics are transferred between the first wire bonding unit 310 and the second wire bonding unit 310 by transfer machines 312, 313.

As described above, in the cell module assemblies 10A, 10B according to this embodiment, for example, the top cap (corresponding to the positive electrode) of each cylindrical battery cell 30 belonging to one bank is connected to a predetermined one-strand sub bus bar 61 with a wire, and the top end of the battery can (corresponding to the negative electrode) of each cylindrical battery belonging to another bank is connected to the same sub bus bar 61 with a wire, so that two banks are connected in series.

In the wire bonding unit 310, one end of the wire (not shown) is fused to the top end of the battery cell 30 to make the above electrical connection structure, and the other end of the wire is fused to the sub bus bar 61 or the main bus bar 62.

As shown in FIG. 8, the first and second wire bonding units 310 respectively include two wire welding machines 311a to 311d. For example, the first wire welding machine 311a of the first wire bonding unit 310 performs half of the wire bonding work for the temporary-assembled cell module assembly, and the second wire welding machine 311b performs the remaining wire bonding work.

The OCV (Open Circuit Voltage) test unit 320 may include a thermal imaging camera (not shown), a test device capable of measuring an open circuit voltage or insulation resistance of the cell module assembly (not shown), and a transfer machine 321.

The thermal imaging camera is used to check abnormality of the wire bonding area first, and a defective product is immediately discharged from the assembly line to the outside using the transfer machine. After the inspection of the thermal imaging camera, insulation resistance and open circuit voltage are measured, and products outside the normal range are discharged from the assembly line. The product that has passed the OCV test unit 320 moves in the third direction and is positioned at the top cover assembling unit 330.

Figure 9:
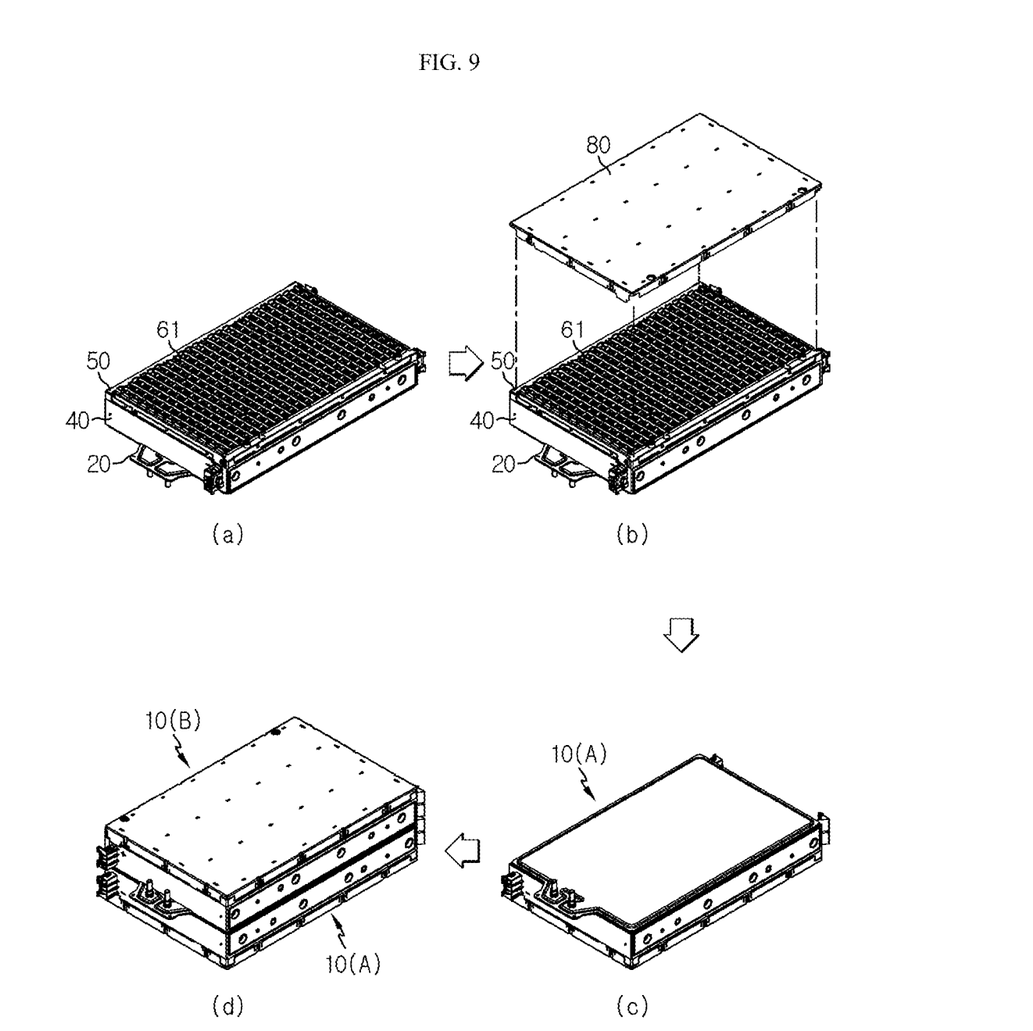
FIG. 9 is a process diagram of the cell module assembly performed in the third facility line of FIG. 8.

As shown in (b) of FIG. 9, the top cover assembling unit 330 may assemble the top cover 80 on the top of the top frame 50 in order to prevent the wire bonding area from being exposed. The top cover 80 may be supplied to the top cover assembling unit 330 by a deck truck (not shown). In this embodiment, the worker mounts the top cover 80 to the top frame 50, but the corresponding work may also be replaced by an automated robot.

If the top cover 80 is completely assembled as above, one cell module assembly 10A is completed. The cell module assembly 10A completed as above is moved to the interchanging unit 340 along the third direction (+X-axis direction), and the interchanging unit 340 may be selectively transferred to one of the first facility line 100 and the fourth facility line 400, explained later.

The interchanging unit 340 may be configured to include a bar code reader (not shown), a rollover machine 341, and a transfer machine 342.

The bar code reader reads a bar code marked in advance on the bottom frame 40 to identify whether the cell module assembly is the first-layer cell module assembly 10A or the second-layer cell module assembly 10B. If only the first-layer cell module assembly 10A is identified, the rollover machine 341 reverses the cell module assembly 10A as shown in (c) of FIG. 9 and transfer it to the heatsink preprocessing unit 110 of the first facility line 100 using the transfer machine 342. After that, the operation of the first facility line 100 to the third facility line 300 is repeated, and when the second-layer cell module assembly 10B reaches the interchanging unit 340 again, as shown in (d) of FIG. 9, the second-layer cell module assembly 10B is stacked on the first-layer cell module assembly 10A to make a stacked battery module with a multi-layer structure.

When the interchanging unit 340 reads the bar code, if a stacked battery module with a multi-layer structure is identified, the rollover machine 341 and the transfer machine 342 do not work, and the stacked battery module is moved to the fourth facility line 400, explained later, along the third direction.

Meanwhile, the assembly line system of the stacked battery module according to this embodiment further includes a fourth facility line 400 configured to mount the side bracket 90 to the cell module assemblies 10A, 10B assembled in a multi-layer structure and perform a final inspection before shipment.

Figure 10:
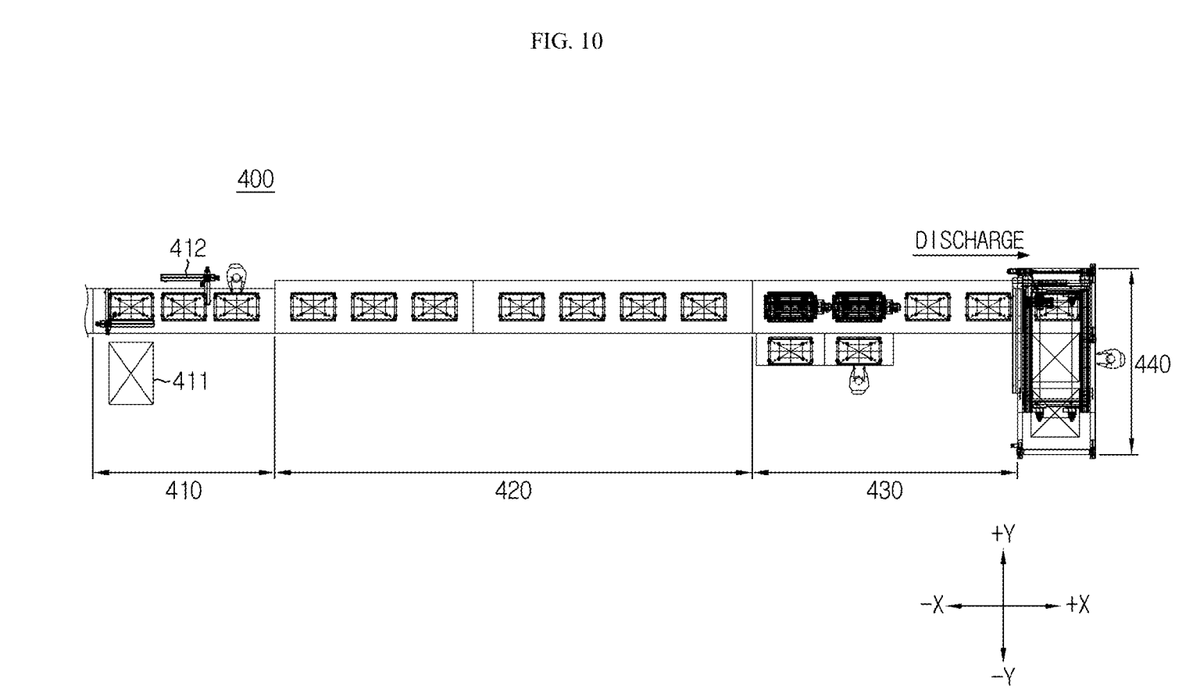
FIG. 10 is an enlarged view showing a fourth facility line of FIG. 3.

Referring to FIG. 10 along with FIG. 3, the fourth facility line 400 may include a side bracket assembling unit 410, a curing unit 420, a final inspection unit 430, and a packaging unit 440.

Figure 11:
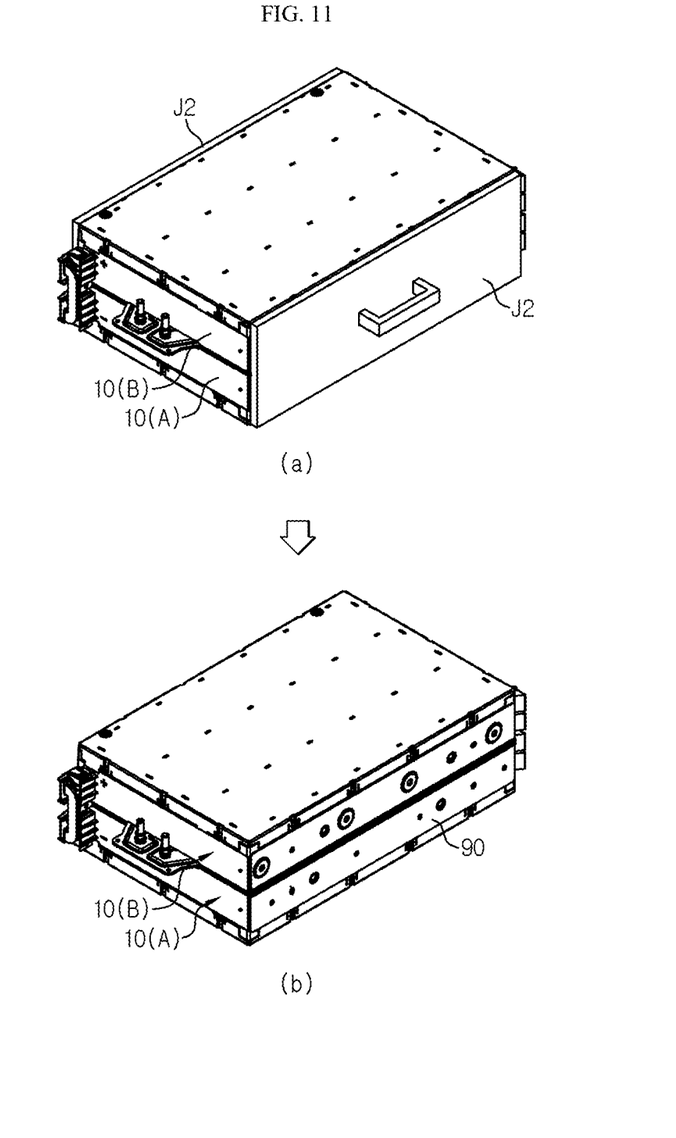
FIG. 11 is a process diagram of the cell module assembly performed in the fourth facility line of FIG. 10.

The side bracket assembling unit 410 is connected to the interchanging unit 340 of the third facility line 300 and arranged in the third direction (+X-axis direction). In the side bracket assembling unit 410, as shown in FIG. 11, the plate-shaped side bracket 90 is attached to both side surfaces of the stacked two cell module assemblies. (Hereinafter, the two stacked cell module assemblies will be referred to as a stacked battery module.)

The side bracket assembling unit 410 may include a plasma surface treatment machine 411 and an adhesive applicator 412. After performing surface-treatment with plasma on the side bracket 90 and both side surfaces of the stacked battery module, they are bonded. In addition, as shown in (a) of FIG. 11, in order to strengthen the bonding force, a bracket fixing jig J2 is mounted to the side surface of the stacked battery module, and the stacked battery module is moved to the curing unit 420. For reference, the side bracket 90 and the bracket fixing jig J2 are supplied using a deck truck (not shown), and the worker performs the corresponding work.

The curing unit 420 is a facility for curing the adhesive so that the side bracket 90 can be bonded well. Although not shown in detail for convenience of the drawing, the curing unit 420 may be implemented in the form of a chamber having a tunnel structure. In addition, inside the chamber, a curing machine that may manage temperature and irradiate infrared ray may be provided.

The final inspection unit 430 is connected to the curing unit 420. The bracket fixing jig J2 may be separated from the final inspection unit 430 and discharged to the outside. After disassembling the bracket fixing jig J2, the worker conducts a leak check test by injecting air into an inlet or outlet of the heatsink 20 and checking leak, and also the worker performs a performance test to check whether the input/output of each battery cell 30 and the operation of the entire system meet the requirements by applying power and load to the stacked battery module.

For example, the leak check test and the module performance test may be performed using a module EOL performance tester and a leak tester. During the final inspection, defective products are discharged out of the assembly line, and only good products are moved to the packaging unit 440 to be packaged and shipped.

As described above, according to an embodiment of the present disclosure, it is possible to provide an assembly line system for a stacked battery module, which may efficiently operate the space by reducing redundant facility investment and reducing the length and area of an equipment layout in building the assembly line of a stacked battery module. In particular, since the assembly line system according to the present disclosure includes the first to third facility lines 300 arranged in a circulation structure of a 'E' shape, cell module assemblies of the same structure may be easily implemented in multiple layers.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

| Reference Signs |
| --- |
| 100: first facility line |
| 110: heatsink preprocessing unit |
| 120: bottom frame assembling unit |
| 130: cell inserting unit |
| 140: top frame assembling unit |
| 200: second facility line |
| 210: component assembling unit |
| 220: jig fastening unit |
| 230: carrying unit |
| 240: curing chamber unit |
| 250: jig dismantling unit |
| 260: jig retrieving line |
| 270: vision inspection unit |
| 300: third facility line |
| 310: wire bonding unit |
| 320: OCV test unit |
| 330: top cover assembling unit |
| 340: interchanging unit |
| 400: fourth facility line |
| 410: side bracket assembling unit |
| 420: curing unit |
| 430: final inspection unit |
| 440: packaging unit |

What is claimed is:

1. An assembly line system for manufacturing a stacked battery module in which two or more cell module assemblies are stacked, the assembly line system comprising:
    a first facility line configured to assemble a cell housing and accommodate battery cells in the cell housing;
    a second facility line connected to the first facility line and configured to assemble an electric connection component and a voltage sensing component; and
    a third facility line connected to the second facility line and configured to connect the battery cells to each other in series and in parallel and to inspect for functional abnormalities of the connected battery cells,
    wherein the first facility line, the second facility line, and the third facility line are arranged and connected to circulate from the first facility line to the second facility line to the third facility line based on a predetermined origin, so that a first-layer cell module assembly assembled by the first, second, and third facility lines in a first circulation the assembled first-layer cell module assembly is reversed to change the top and bottom thereof, and a second-layer cell module assembly is assembled by the first, second, and third facility lines on the first-layer cell module assembly in a second circulation,
    wherein the first facility line is arranged along a first direction, and
    wherein the first facility line includes:
        a heatsink preprocessing unit at the predetermined origin and configured to receive a heatsink to perform plasma treatment on a surface of the heatsink;
        a bottom frame assembling unit configured to attach a bottom frame to one surface of the heatsink;
        a cell inserting unit configured to insert battery cells into cell insert holes in the bottom frame; and
        a top frame assembling unit configured to cover the battery cells and assemble a top frame to be coupled with the bottom frame.

2. The assembly line system of a battery module according to claim 1, wherein the first facility line, the second facility line, and the third facility line are arranged in a circulation structure of a rectangular shape.

3. The assembly line system of a battery module according to claim 1, wherein the bottom frame assembling unit includes a bar code laser marking machine configured to mark a bar code on the bottom frame.

4. The assembly line system of a battery module according to claim 1, wherein the first facility line includes a plasma surface treatment machine configured to preprocess surfaces of the heatsink, the bottom frame, the battery cell, and the top frame with plasma.

5. The assembly line system of a battery module according to claim 1, wherein, in the first facility line, a unique bar code that stores layer number information is marked in advance on the cell housing, and
wherein the first facility line, the second facility line, and the third facility line are configured to identify the first-layer cell module assembly and the second-layer cell module assembly by reading the bar code.

6. The assembly line system of a battery module according to claim 1, wherein the second facility line is connected to the first facility line, and
wherein the second facility line includes:
a component assembling unit arranged along the first direction and configured to attach a plurality of bus bars and a sensing cable to the top frame;
a jig fastening unit arranged along the first direction in succession to the component assembling unit and configured to mount a press jig to a temporary-assembled cell module assembly immediately after passing through the component assembling unit;
a carrying unit configured to carry the temporary-assembled cell module assembly to which the press jig is mounted in a second direction intersecting the first direction;
a curing chamber unit arranged along a third direction opposite to the first direction at a location spaced apart from the jig fastening unit in the second direction by a predetermined interval and configured to cure an adhesive applied to the temporary-assembled cell module assembly;
a jig dismantling unit configured to dismantle the press jig from the temporary-assembled cell module assembly that has passed through the curing chamber unit; and
a vision inspection unit configured to inspect an appearance of the temporary-assembled cell module assembly from which the press jig is dismantled.

7. The assembly line system of a battery module according to claim 6, wherein the curing chamber unit includes a plurality of curing chamber units arranged side by side along the third direction.

8. The assembly line system of a battery module according to claim 6, wherein an infrared ray is irradiated into the curing chamber unit so that the curing chamber unit maintains an internal temperature of 45° C. to 65° C.

9. The assembly line system of a battery module according to claim 6, wherein the second facility line further includes a jig retrieving line arranged in a direction different from the vision inspection unit with respect to the jig dismantling unit and configured to carry out the press jig separated from the jig dismantling unit.

10. The assembly line system of a battery module according to claim 6, wherein the third facility line is connected to the second facility line, and
wherein the third facility line includes:
a wire bonding unit arranged along the third direction and configured to bond the battery cells and the plurality of bus bars in a predetermined pattern onto the top frame using a wire;
an OCV (Open Circuit Voltage) test unit configured to inspect an abnormality by inspecting an appearance of the wire bonding and measuring an OCV;
a top cover assembling unit configured to attach a top cover onto the wire-bonded top frame; and
an interchanging unit configured to selectively carry the cell module assembly to which the top cover is attached from the top cover assembling unit to the heatsink preprocessing unit of the first facility line.

11. The assembly line system of a battery module according to claim 10, wherein the wire bonding unit includes a plurality of wire bonding units arranged side by side along the third direction.

12. The assembly line system of a battery module according to claim 10, wherein the interchanging unit includes a rollover machine configured to reverse the first-layer cell module assembly to change the top and bottom thereof, and a transfer machine configured to transfer the first-layer cell module assembly to the heatsink preprocessing unit.

13. The assembly line system of a battery module according to claim 10, wherein the interchanging unit includes a bar code reader configured to read a bar code marked in advance on the bottom frame.

14. The assembly line system of a battery module according to claim 10, further comprising:
a fourth facility line connected to the third facility line and not connected to the first facility line, the fourth facility line configured to inspect performance of the stacked battery module and configured to package the stacked battery module.

* * * * *